Patented Dec. 24, 1935

2,025,370

UNITED STATES PATENT OFFICE 2,025,370

AMINO-HALOGENANTHRAQUINONE SULPHONIC ACIDS

Fritz Baumann, Leverkusen-I. G. Werk, Germany, assignor to General Aniline Works, Inc., New York, N. Y., a corporation of Delaware No Drawing. Application January 26, 1932, Serial No. 589,062. In Germany January 29, 1931

6 Claims. (Cl. 260—59)

The present invention relates to a process of preparing amino-halogenanthraquinone sulphonic acids and to the new products obtainable by said process.

In accordance with the invention new amino-halogenanthraquinone sulphonic acids are prepared by reacting with a sulphonating agent upon a compound of the formula

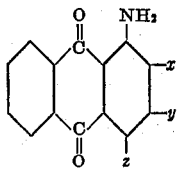

wherein $x$ means halogen, $y$ hydrogen or halogen and $z$ hydrogen or the amino- or hydroxy group. As sulphonating agents I prefer those containing sulphur trioxide or being capable of splitting off sulphur trioxide under the conditions of working, such as fuming sulphuric acid, chlorosulphonic acid etc. In many cases the best results are obtained, when applying a fuming sulphuric acid of between about 12–30% strength. When applying chlorosulphonic acid as the sulphonating agent, the same is advantageously used in admixture with sulphuric acid monohydrate and in an amount of at least about one molecular weight on each molecular weight of the anthraquinone derivative to be sulphonated. Furthermore, the addition of boric acid is advantageous in many cases in order to prevent by-reactions. Heating of the reaction mixture is necessary to bring about the sulphonation of the anthraquinone derivatives in question.

It may be mentioned that the temperature, at which reaction performs best, is dependent to a far reaching degree on the strength of the sulphonating agent applied. For example, fuming sulphuric acid of 15% strength will require a higher temperature than fuming sulphuric acid of 30% strength. Generally, good results will be obtained in all cases, when working at a temperature between about 110–160° C., but higher or lower temperatures are likewise operable in most cases.

When working in the manner described above, anthraquinone sulphonic acid derivatives of the probable formula

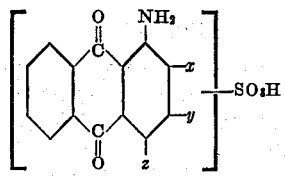

wherein the littera are to be explained as mentioned for the formula above, are obtained in a good yield. These sulphonic acids, which for the most part have been unknown hitherto, are in form of their alkali metal salts yellowish-brown to dark blue powders, easily soluble in water, soluble in strong sulphuric acid with various colorations, changing in color upon the addition of formaldehyde. They dye wool from an acid bath yellowish-brown to bluish-violet shades of good fastness properties.

It may be mentioned that the smooth formation of the compounds in question according to the process above described is most surprising, since it was to be expected that by the treatment of the starting materials with the sulphonating agents, the halogen atoms would be replaced by hydroxy groups, as is the case when heating, for example, 1-amino-4-halogen anthraquinone with sulphonating agents and boric acid.

The following examples illustrate the invention, without limiting it thereto, the parts being by weight.

Example 1

6.5 parts of crystallized boric acid are dissolved in 120 parts of fuming sulphuric acid of 20% strength, while adding the boric acid slowly. 15.4 parts of 1,4-diamino-2,3-dichloroanthraquinone are then added and the reaction mixture is heated for a short time to 60° C., after which 20 parts of chlorosulphonic acid are stirred in. The reaction mixture is then heated to 145–150° C., until a test portion poured into water yields a blue-violet solution after boiling. Thereafter, the reaction mixture is poured into 2000 parts of ice water and boiled up. After filtering, the reaction product is salted out from the filtrate with sodium chloride at 45–50° C. It can be purified by recrystallization from a mixture of water and pyridine, to which mixture some sodium chloride has been added. Beautiful blue needles are thus obtained, dissolving in concentrated sulphuric acid nearly colorless, in water with a blue-violet coloration, dyeing wool from an acid bath a clear and even violet shade, especially fast to light. The product corresponds in its free form to the probable formula:—

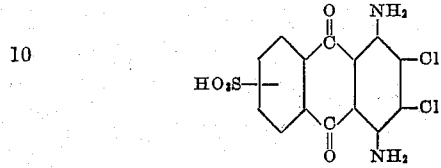

The sulphonation of the above starting material can likewise be performed while applying a sulphonating agent upon 1 part of 1,4-diamino-2,3-dichloro-anthraquinone 7 parts of fuming sulphuric acid of 40% strength. Boric acid should likewise be added in this case and the temperature be held at about 120–125° C.

Instead of the starting material of the above example, 1,4-diamino-2,3-dibromoanthraquinone or 1,4-diamino-2-chloro-3-bromo-anthraquinone (obtainable by chlorinating 1,4-diamino-3-bromo-anthraquinone) may be applied with the formation of acid wool dyestuffs of similar properties.

*Example 2*

4.4 parts of crystallized boric acid are slowly introduced into a mixture of 30 parts of sulphuric acid monohydrate and 30 parts of fuming sulphuric acid of 65% strength, while stirring. After the boric acid has dissolved, 20 parts of fuming sulphuric acid of 65% strength and 10 parts of 1,4-diamino-2-bromoanthraquinone (obtainable from 1-amino-2,4-dibromoanthraquinone with p-toluenesulphamide and saponification of the reaction product) are added. The reaction mixture is then heated to 120–150° C. while stirring, until a test portion is completely soluble in water. After cooling, the reaction mixture is poured into ice water, containing some sodium bisulphide, and the reaction product is isolated by salting out with sodium chloride. It can be purified by redissolving it from diluted methyl alcohol. The dyestuff thus obtainable forms a bluish-black powder, dissolving in water with a violet coloration and dyeing wool from an acid bath violet shades of good fastness properties. The color of the solution of the new product in concentrated sulphuric acid is weakly brown and changes to reddish-violet at the addition of boric acid and to blue at the addition of formaldehyde. Instead of the starting material of this example 1.4-diamino-2-chloroanthraquinone may be applied with a similar result.

*Example 3*

100 parts of fuming sulphuric acid of 40% strength, 7 parts of crystallized boric acid and 16 parts of 1-amino-2-bromo-4-hydroxyanthraquinone (obtainable from 1-amino-2,4-dibromoanthraquinone with sulphuric acid in the presence of boric acid) are heated together, while stirring, to a temperature of 150° C., until a test portion is soluble in water with a red coloration. The working up of the reaction mixture may be performed as described in Example 1. Red needles are thus obtained, dissolving in water with a bluish-red coloration, turning to blue at the addition of caustic soda solution. The new product dissolves in concentrated sulphuric acid with a yellow coloration, turning to orange-red at the addition of boric acid, and first to green then to blue at the addition of formaldehyde.

The 1-amino-2-bromo-4-hydroxyanthraquinone in this example may be substituted by 1-amino-4-hydroxy-2,3-dichloro-anthraquinone (obtainable from 1,4-diamino-2,3-dichloro-anthraquinone over the mono-diazo-compound) with the formation of a dyestuff of similar properties.

*Example 4*

20 parts by weight of 1-amino-2-bromo-anthraquinone are heated in 180 parts of fuming sulphuric acid of 20% strength for 20 minutes to 145–150° C. After that, the reaction mixture is poured into ice water and the reaction product salted out by means of sodium chloride. It dissolves in concentrated sulphuric acid with a weakly greenish coloration, turning to blue upon the addition of formaldehyde, and dyes wool from an acid bath yellowish-brown shades.

I claim:—

1. The process which comprises heating a compound of the formula

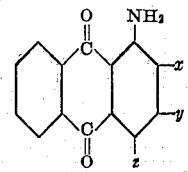

wherein $x$ means halogen, $y$ hydrogen or halogen and $z$ hydrogen, the hydroxy or the amino group, with fuming sulphuric acid of between about 12 and about 30% strength to a temperature of about 110 and about 160° C.

2. The process which comprises heating a compound of the formula

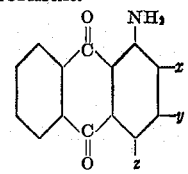

wherein $x$ means halogen, $y$ hydrogen or halogen and $z$ hydrogen, the hydroxy or the amino group, with fuming sulphuric acid of between about 12 and about 30% strength to a temperature of about 110 and about 160° C. in the presence of boric acid.

3. The process which comprises reacting upon a compound of the formula

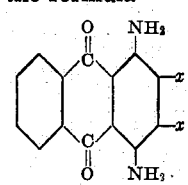

wherein at least one $x$ means chlorine or bromine with fuming sulfuric acid of between about 12 and about 30% strength at a temperature of about 110 and about 160° C. in the presence of boric acid.

4. The compounds having in their free form the general formula

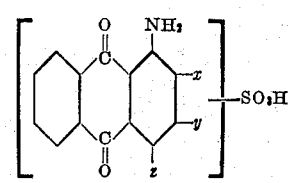

wherein $x$ means halogen, $y$ hydrogen or halogen and $z$ the hydroxy or amino group, said compounds being in form of their alkali metal salts violet-red to dark blue powders, easily soluble in water, soluble in strong sulfuric acid with various colorations, which change at the addition of formaldehyde, dyeing wool from an acid bath violet-red to bluish-violet shades of good fastness properties.

5. The compounds having in their free form the formula

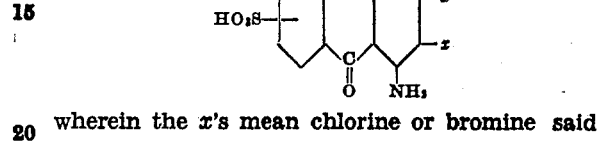

wherein the $x$'s mean chlorine or bromine said compounds being in form of their alkali metal salts blue products, dyeing wool from an acid bath strong bluish-violet shades of good fastness properties.

6. The compounds having in their free form the formula:—

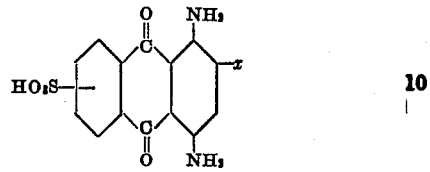

wherein $x$ means chlorine or bromine, said compounds being in form of their alkali metal salts bluish-black powders, dyeing wool from an acid bath blue violet shades of good fastness properties.

FRITZ BAUMANN.